April 12, 1949.  J. L. EVANS ET AL  2,466,938
TRANSPORTATION ASSEMBLY
Filed May 13, 1946  5 Sheets-Sheet 1
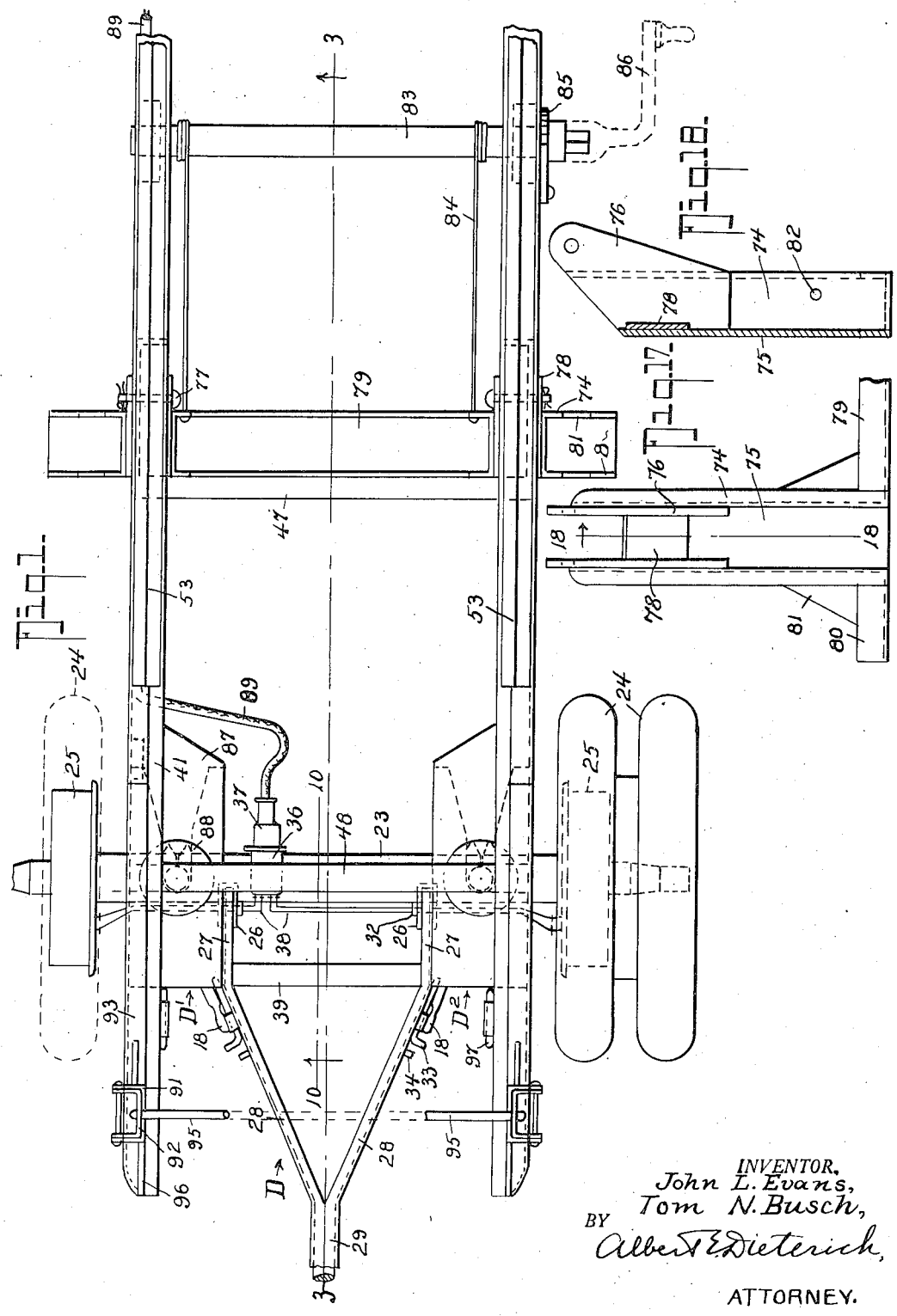
INVENTOR.
John L. Evans,
Tom N. Busch,
BY Albert E. Dieterich,
ATTORNEY.

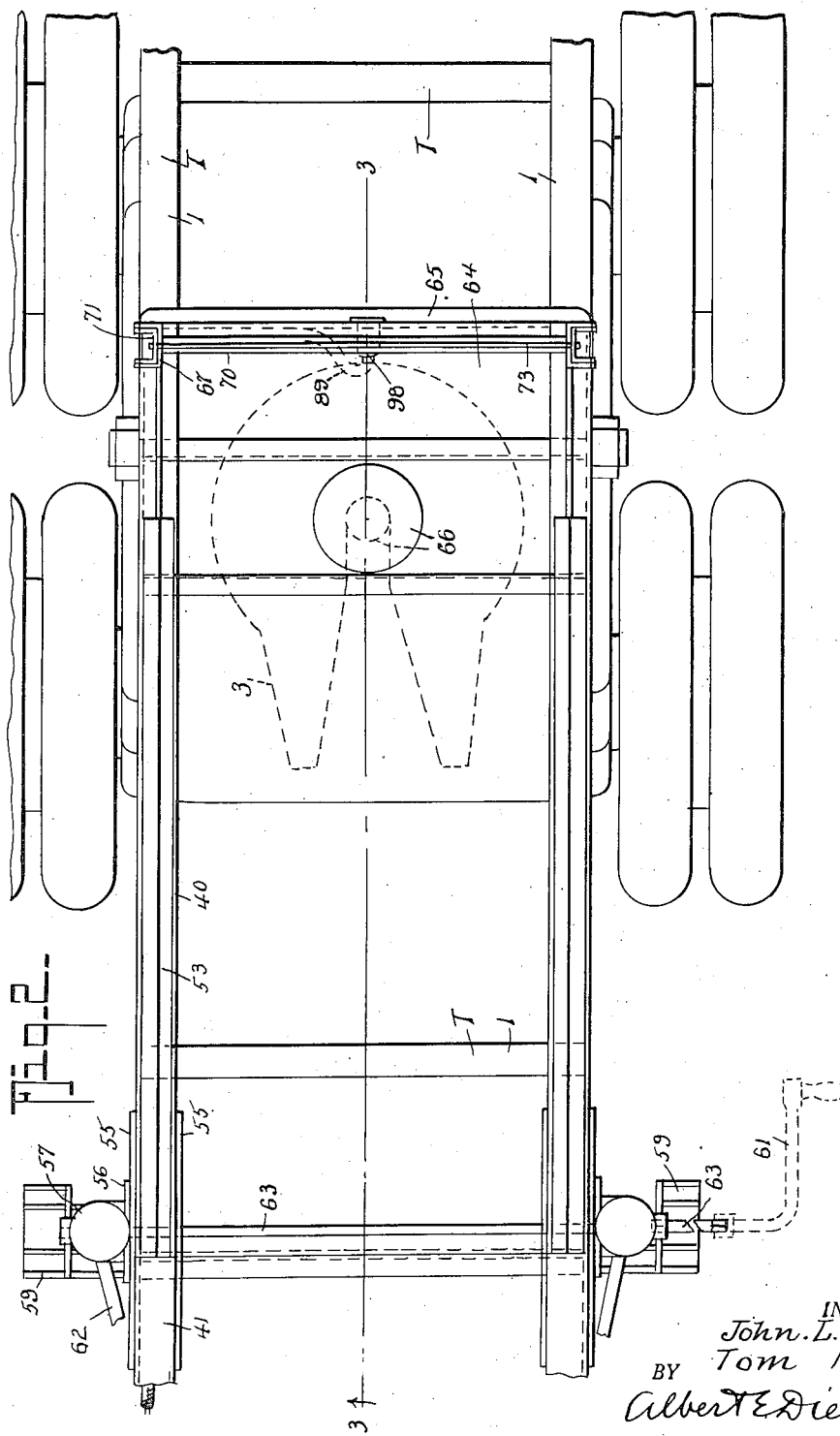

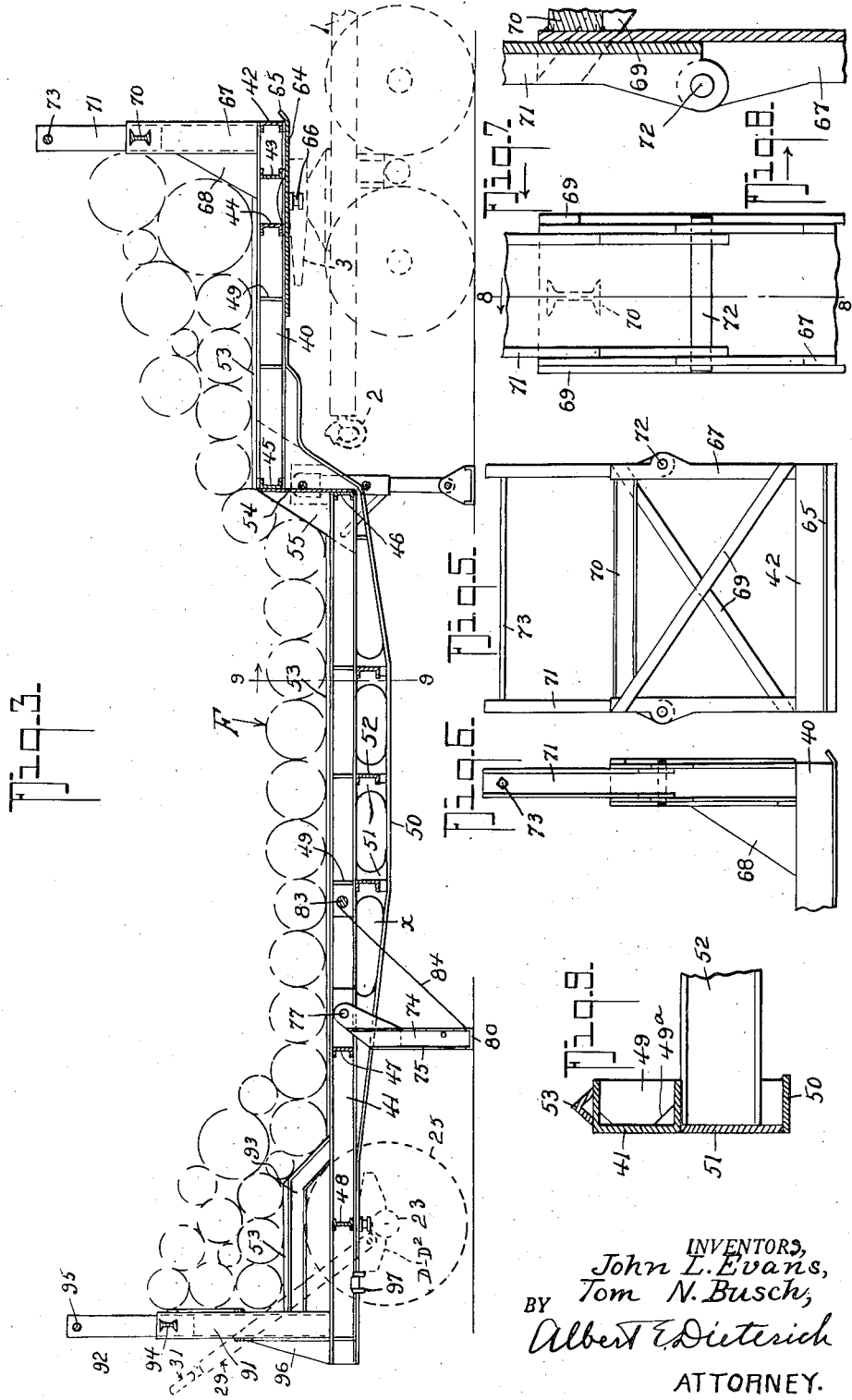

April 12, 1949. J. L. EVANS ET AL 2,466,938
TRANSPORTATION ASSEMBLY
Filed May 13, 1946 5 Sheets-Sheet 4
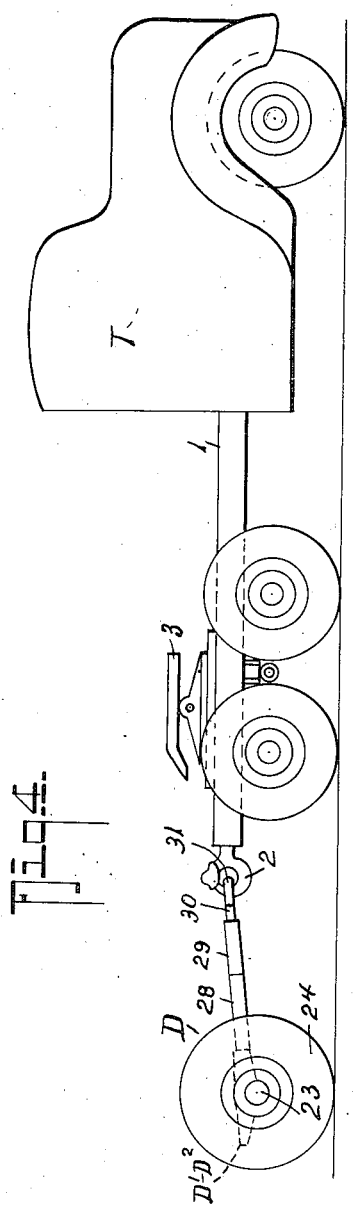
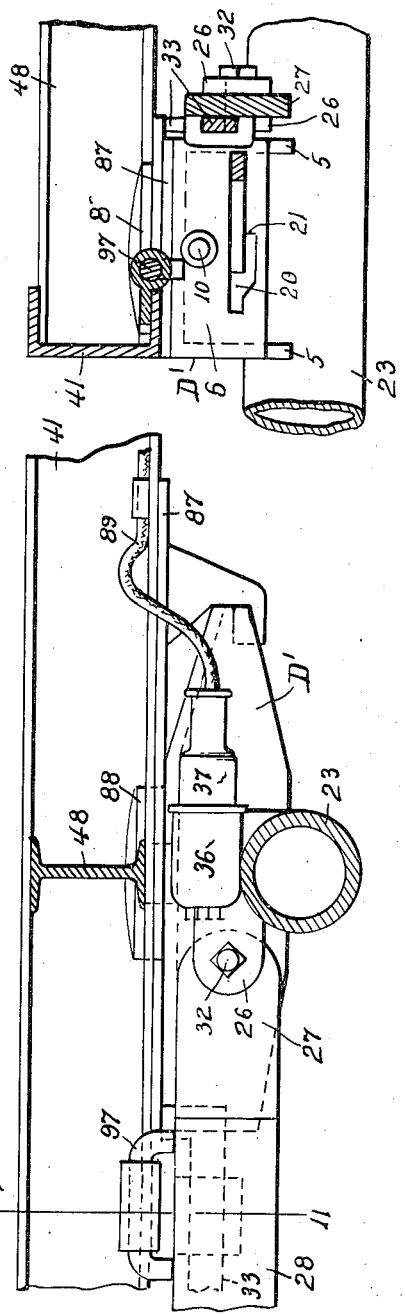
INVENTOR,
John L. Evans,
BY Tom N. Busch,
Albert E. Dieterich
ATTORNEY.

April 12, 1949.  J. L. EVANS ET AL  2,466,938
TRANSPORTATION ASSEMBLY
Filed May 13, 1946  5 Sheets-Sheet 5
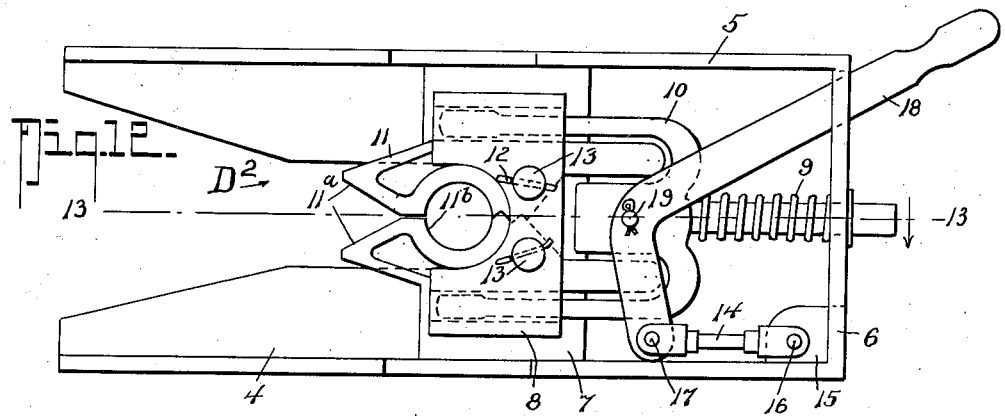
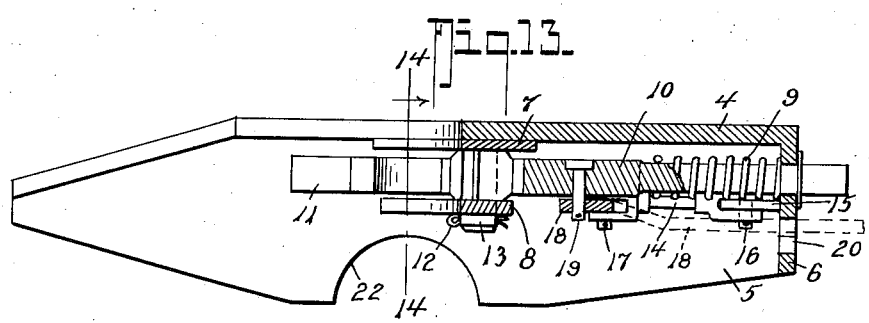
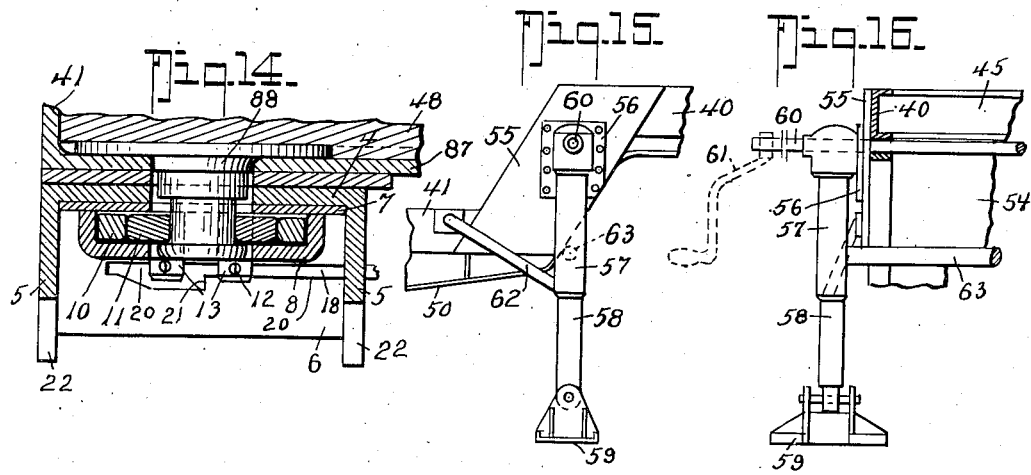
INVENTORS,
John L. Evans,
Tom N. Busch,
BY Albert E. Dieterich,
ATTORNEY.

Patented Apr. 12, 1949

2,466,938

UNITED STATES PATENT OFFICE 2,466,938

TRANSPORTATION ASSEMBLY

John L. Evans and Tom N. Busch, Sumter, S. C.

Application May 13, 1946, Serial No. 669,401

10 Claims. (Cl. 280—33)

Our invention has for its objects to provide means to reduce the cost of equipment, reduce expense in transportation, eliminate the necessity of keeping equipment idle for considerable periods of time while loading and unloading, and enable a tractor to be used continually in pulling loads from loading places to delivery places.

Other objects will in part be obvious and in part be pointed out hereinafter.

To the attainment of the aforesaid objects and ends, invention resides in the novel details of construction, combinations and arrangement of parts, which will hereinafter be first fully described and then be specifically pointed out in the appended claims, reference being had to the accompanying drawings in which:

Fig. 1 is a top plan view of the rear portion of an apparatus embodying our invention.

Fig. 2 is a top plan view of the fore part of the same, a portion of a towing tractor being indicated in position for towing the apparatus.

Fig. 3 is a central vertical longitudinal section of the frame, crib bed or rack unit, the detachable wheeled axle unit being shown in dotted lines and the portion of the tractor also being shown in dotted lines, the section being taken on the lines 3—3 of Figs. 1 and 2 and being drawn on a smaller scale.

Fig. 4 is a schematic side elevation of the detachable wheeled axle unit being towed by a tractor.

Fig. 5 is a detail front elevation of the front standard.

Fig. 6 is a side elevation of the same.

Fig. 7 is an enlarged side elevation of a hinge joint between the fixed and movable standard posts.

Fig. 8 is a section on the line 8—8 of Fig. 7.

Fig. 9 is a detail cross section, on a larger scale, on the line 9—9 of Fig. 3.

Fig. 10 is an enlarged detail vertical longitudinal section on the line 10—10 of Fig. 1.

Fig. 11 is a cross section on the line 11—11 of Fig. 10.

Fig. 12 is an enlarged inverted plan view of one of the automatic locking devices carried by and forming a part of the detachable wheeled axle.

Fig. 13 is a longitudinal section of the same on the line 13—13 of Fig. 12.

Fig. 14 is a cross section on the line 14—14 of Fig. 13.

Fig. 15 is a detail side elevation of one of the landing gear lifts.

Fig. 16 is a front elevation of the parts shown in Fig. 15.

Fig. 17 is a front elevation of one of the stiff legs.

Fig. 18 is a vertical section on the line 18—18 of Fig. 17.

In its generic aspect the invention comprises two units which, when used independently, have separate functions and are capable of being combined to function as a single unit. The first unit is a frame, crib bed, or rack (hereinafter, for convenience in description, is called a frame) capable of containing, and/or supporting, freight, machinery, structures or other fixtures and commodities, either stationary or in transit. The second unit is an assembly consisting of an axle, wheels, tracks and/or skids, and when necessary, equipped with proper lights and brakes (hereinafter referred to as the detachable wheeled axle unit).

Provisions are made so that the detachable wheeled axle unit can be attached to the frame by means of two semi-automatic aligning and locking devices which fix the axle and wheels in proper relation with the frame as to position and alignment, thus combining the two units into a single unit that can be compared to the conventional semi-trailer and used as such when connected behind a truck or tractor by means of a conventional fifth wheel and king pin.

The frame is equipped with a set of legs near each end for the purpose of supporting the frame in a position for easy removal and replacement of the detachable wheeled axle unit and the tractor. The legs can be retracted when the frame is in a mobile condition.

Having thus given a brief outline of the units comprising the present invention for a more detailed description of the same reference is now made to the accompanying drawings in which like numerals and letters of reference indicate like parts in all the figures.

In Fig. 4, the tractor, T, has its frame 1 provided with a towing hook 2 and the usual fifth wheel 3 of any suitable and approved type.

The detachable wheeled axle unit D is shown in Fig. 4 as coupled to the tractor for transportation purposes as will later more fully appear. The construction of the unit D is best illustrated in Figs. 1, 12, 13, and 14 by reference to which it will be seen that the axle 23 is provided with suitably tired wheels 24, and brake drums 25. At a suitable distance apart on the axle 23 there are fixed two semi-automatic aligning and locking devices (right and left). Each such aligning and locking device comprises a face plate 4, side plates 5, an end plate 6, a base plate 7 (welded or otherwise secured to the face plate 4), a bridge plate 8, a compression spring 9, a sliding yoke 10, a pair of locking jaws 11, jaw pivot studs or pins 13, with cotter pins 12, a release lever 18, pivoted at 19 to the yoke 10 and at 17 to a link 14 which in turn is pivoted on a pin 16 to a bracket 15 fixed to the end plate 6 and a side plate 5. The locking jaws 11 have flared entrance parts 11a and a king-type pin receiving portion 11b. The end plate 6 has a slot 20 through which the lever 18 projects. The slot 20 has a shoulder 21 to hold the lever 18 in the released position to free the jaws 11.

Each side wall 5 has a recess 22 to fit the axle 23 to which the walls 5 are welded securely. Also securely welded to the axle 23 are bifurcated brackets 26 between the furcations of which the separated parallel ends 27 of draft appliance bars are pivoted as at 32. The draft bars converge, as at 28, and terminate in parallel adjacent end portions 29 that are securely fastened to a draft rod or bar 30 having an eye 31 to hitch to the hook 2 of a tractor when the wheeled axle unit is to be disconnected from, towed, or connected to the frame unit F.

A sliding latch 33 is mounted at 35 on each portion 28 of the draft appliance so as to be capable of cooperating with the fixed coupling-pin carrying plates 87 of the frame unit, suitable back stops 34 being provided to keep the bolts from becoming lost. A brace bar 39 connects the elements 27 together.

When the detachable wheeled axle unit is connected to the tractor for removal from the frame unit and for towing the draft appliance is lowered until the latches can be placed beneath the plates 87 (see Figs. 1 and 10).

When the units are connected to act as one the draft appliance is raised until the latches can be placed over the plates and hold the pivoted member elevated.

Mounted on the axle 23 is an electric brake coupling socket 36 from which power lines 38 lead to the brake drums 25.

The frame unit comprises parallel side longitudinal beams 40 and 41, the pair of beams 40 being elevated above the pair 41 and being located at the fore part of the frame, thus forming two sub-frames. The fore sub-frame includes the parallel side beams 40 and the cross beams 42, 43, 44 and 45 rigidly secured together. A bed plate 64 is secured beneath and to the sub-frame and carries a king pin 66 for coupling to the fifth wheel 3 of a truck or tractor T. The plate 64 has a projecting turned up front end 65 to facilitate coupling operations.

The main sub-frame includes the side beams 41, the cross beams 46, 47 and 48 and the trusses composed of the longitudinal bars 50, the truss posts 51 and the cross beams 52. Brackets 49 having bevelled corners 49a to pass brake and light wiring may also be provided in the channels of the beams 41.

Inverted angle bars are secured (by welding or otherwise) to the top edges of the beams 40 and 41 to present sharp edges to logs or other loads which might tend to slip sidewise of the frame.

The rear end of the fore sub-frame is joined to the front end of the main sub-frame by a vertical cross plate 54 and side plates 55. Secured to each side plate 55 is the mounting plate 56 of a landing gear which includes a fixed section 57 and a telescopic section 58 to which telescopic section a foot 59 is pivoted so that when not in use it may be inverted and folded against the fixed section when the telescopic section is raised. The landing gear may be of the well known screw-jack type and includes also, the operating shaft 60 (common to both landing gears) and to which a crank 61 can be attached for operating purposes (see dotted lines Fig. 16). The fixed sections of the landing gears on opposite sides of the frame are connected together by a brace rod 63 and said sections are further supported by braces 62 (see Figs. 3 and 15).

At the front end the sub-frame 40 carries front standards comprised of side beams or posts each consisting of a fixed lower part 67 and a hinged (72) upper part 71, best shown in Figs. 5, 6, 7 and 8. The upper and lower parts 71, 67 are rule-jointed as at 72. The post parts 67 are cross braced as at 69 and the post parts 71 are cross connected by a detachable rod 73. The posts 67 are further braced as at 68, and 70.

A similar standard assembly composed of fixed post sections 91 and hinged post sections 92, braces 94 and rod 95 etc. may be provided at the rear end of the frame, in which event arched brace beams 93 connect the frame beams 41 and lower post sections 91 together. Brace plates 96 may also be used if necessary.

Toward the rear of the frame F there is pivoted at 77 to each side beam 41, a stiff leg composed of two side channel irons 74 spaced apart and connected at the back edges by a plate 75. Hinge forming plates 76 are securely welded or otherwise fastened to the channel irons 74 and spaced apart by a plate 78. The pivots 77 pass through the hinge plates 76.

A foot angle 79 is welded to the lower ends of the inner channel irons 74 and join the two legs together to move about a common axis (hinge pins 77). Short extension angles 80 are welded to the lower ends of the outer angles 74 and are braced therefrom as at 81. The stiff legs may be raised and lowered by a winch shaft 83 and cables 84, a ratchet and pawl device 85 being provided to hold the said legs up when not in use. A crank 86 is used to turn the shaft 83. Instead of the winch, or in addition thereto the legs may have pin holes 82 through which and the spaces $x$ in the truss hold up rods may be passed to hold the legs up when not in use.

To the rear of the stiff legs, coupling-pin-carrying plates 87 are secured to the beams 41 and to the cross I-beam 48 and carry the coupling pins 88 for the detachable wheeled axle unit.

Braking (and lighting when desired) power is transmitted from the tractor T from the front coupling socket member 98 via a cable or cables 89 and connecting plug 37, to the detachable wheeled axle unit when the unit and tractor are coupled to the frame (see Figs. 1 and 2).

Pivoted safety catches 97 are provided to drop down behind the end plates 6 to prevent accidental disconnection of the wheeled axle unit.

The detachable wheeled axle assembly is provided with the draw bar or tongue thus making it possible to connect this unit direct to the tractor for the purpose of transporting it from one place to another independent of the frame and for installing the detachable wheeled axle unit under the frame. It is intended that the detachable axle will be used with one or more frames. Two of the special standardized locking devices are used to make the detachable wheeled axle easily installed under any of several frames, thus making it possible for one frame to be in transit with the detachable wheeled axle while other frames are being loaded or otherwise engaged. Thus by alternately transporting one frame then another, maximum use can be derived from the mobile assembly and tractor since lost transit time due to loading or unloading can be practically eliminated. This can be done with a much smaller investment in equipment, than would otherwise be necessary, since one detachable wheeled axle can serve two or more frames. Further savings will result from the fact that only one trailer combination need be licensed. No license is required for extra frames, for the wheeled axle assembly will carry a license plate which will apply to any frame being used. In cases where it might be desirable or necessary to leave a frame for considerable length of time for loading or for other reasons, it could be done without undue risk, since the detachable wheeled axle assembly, which comprises the parts most vulnerable to theft or damage, can be removed and used with other frames.

Under some hauling conditions considerable benefit is derived from the fact that the wheeled axle is detachable and can be interchanged during a single haul which makes the equipment more adaptable to varying on and off the road hauling conditions.

The very fact that the wheeled axle assembly is detachable and can be easily and quickly removed makes it possible to apply this feature to additional uses where the presence of axle and wheel present a temporary problem. As an illustration: the removal of the wheeled axle assembly makes it possible to lower the rear end of the frame to the ground, thereby permitting the frame itself to be used as ramp for the purpose of loading and unloading heavy freight or machinery.

The provision of the jack-type landing gear in combination with the stiff legs makes it possible to pivot the frame on the stiff legs to facilitate passage of the detachable wheeled axle unit under the frame, and/or the tractor under the frame. Assume that the frame F is coupled to a tractor at the front of the frame and to a detachable wheeled axle assembly at the rear of the frame (see dotted lines Fig. 3) and assume further that the stiff leg 74 and the landing gear 57, 58 are raised from the ground and the wheels 25 are resting on the ground. In this position the frame is drawn by the tractor to the place where the frame is to be loaded. Upon arrival at that place the attendant lowers the stiff leg 74 until the foot thereof engages the ground; sufficient slack is left in the cable 84 so that the stiff leg may assume a position at right angles to the frame. Upon lowering the stiff leg to the ground the operator moves the tractor slightly forward, thereby causing the place of contact between the foot of the stiff leg and the ground to act as a fulcrum and cause the rear end of the frame to be lifted sufficiently to take the weight of the frame off the detachable wheeled axle assembly. The attendant then lowers the landing gear until the feet 59 thereof engage the ground. The tractor is then uncoupled from king pin 66 and moved around to the rear of the frame and coupled to the detachable wheeled axle unit (part 2 is coupled to part 3).

The detachable wheeled axle unit is then unlatched from the frame and towed away (Fig. 4) to be attached to another standing frame that has been loaded. In attaching the detachable wheeled axle assembly unit to such another frame, the foregoing process is reversed. That is to say, the detachable wheeled axle unit is first backed under the rear of the frame and coupled to the same. If in backing it should appear that the rear end of the frame is too high or too low to permit easy coupling the height of the rear end may be adjusted by telescoping or extending the landing gear sections 58 as the case may be, using the stiff leg as a fulcrum.

After the detachable wheeled axle unit has been connected to the frame, the tractor is uncoupled from that unit and moved around to the front end of the frame where it is then coupled to the king pin 66. The landing gear is then raised. The tractor is backed slightly to break the rule joint of the stiff leg and leave that leg free to be elevated by winding up the cable 84. After the stiff leg has been elevated the loaded frame may then be towed away. Upon arriving at the place where it is to be unloaded the tractor and the detachable wheeled axle unit are again disconnected from the frame in the manner hereinbefore described and the wheeled axle unit is coupled to the tractor and returned to the starting place where it may be coupled to another loaded frame, and so on.

The drawings illustrate our invention as applied to the hauling of logs and cord wood, for purposes of illustration, it being obvious that other uses can be found for the frame unit.

From the foregoing description taken with the accompanying drawing it is thought the construction, operation and advantages of the invention will be clear to those skilled in the art.

What we claim is:

1. In combination, a semi-trailer frame having means at the front for coupling to the fifth wheel of a conventional tractor, a wheeled axle unit, means detachably connecting said unit to the rear portion of said frame, and means to support the frame while said unit and the tractor are being coupled to and uncoupled from said frame and while the tractor and wheeled axle unit are apart from the frame, said last named means including a stiff leg pivoted to the frame beneath the same and adjacent one end of the frame and a vertically extensible leg rigidly mounted on and beneath the frame adjacent its other end and means for extending and retracting said rigidly mounted leg in a vertical direction.

2. A semi-trailer type frame having a king pin at its front end located in the mid-vertical longitudinal plane of the frame, for coupling to the fifth-wheel of a tractor and having a right and a left coupling pin at the rear end, a wheeled axle unit having a right and a left coupling device for cooperation respectively with said right and left coupling pins when engaged therewith to support the rear end of said frame, landing gear on said frame adjacent the front end of the same and stiff legs on said frame adjacent the rear end of said frame, said landing gear and said legs being located at positions between said king pin and said coupling pins.

3. A detachable wheeled axle unit for semi-trailer frames comprising an axle with wheels, a right coupling unit and a left coupling unit secured to said axle and spaced apart, and a draft tongue coupled to said axle, each of said coupling units comprising a face plate having a coupling-pin-receiving slot, locking jaws mounted on said plate for cooperation with a coupling pin, a jaw-holding yoke, means continuously urging said yoke to close said jaws and hold same closed, and means to open said jaws at will.

4. A semi-trailer frame having a king pin adjacent one end and right and left coupling-pin-carrying plates secured to said frame adjacent the rear end of the frame; a detachable wheeled axle unit having a right and a left coupling device for cooperating with the coupling pins of the respective coupling-pin-carrying plates, said coupling devices each including a face plate to lie under and against the respective coupling-pin-carrying plate aforesaid and pin-engaging coupling jaws mounted on said face plate, said face plate and said jaws having coupling pin entrances, and releasable means for holding said jaws closed in pin-holding position.

5. A semi-trailer frame having a king pin adjacent one end and right and left coupling-pin-carrying plates secured to said frame adjacent the rear end of the frame; a detachable wheeled axle unit having a right and a left coupling device for cooperating with the coupling pins of the respective coupling-pin-carrying plates, said coupling devices each including a face plate to lie under and against the respective coupling-pin-carrying plate aforesaid and pin-engaging coupling jaws mounted on said face plate, said face plate and said jaws having coupling pin entrances, and releasable means for holding said jaws closed in pin-holding position, and a draft tongue operatively secured to said axle.

6. A semi-trailer unit including a frame having a stepped-up front portion provided with a king pin for coupling to a tractor, and having right and left coupling-pin-carrying elements adjacent its rear end, stiff frame-supporting legs pivoted to the frame adjacent its rear end but in front of said coupling-pin-carrying elements, and retractable landing gear secured to the frame adjacent the front of the frame at the rear of said stepped-up portion, said landing gear having provision for moving the front end of said frame up and the rear end of the frame down and vice versa on said stiff legs as a fulcrum for purposes described.

7. The structure according to claim 6 wherein each stiff leg is pivoted to the frame with a rule joint which will break when the frame is pushed backward, and means to retain said legs in an inoperative position when desired.

8. In combination, a semi-trailer frame having means at the front end for coupling to the fifth wheel of a conventional tractor, a detachable wheeled axle unit, means detachably connecting said unit to and beneath the rear portion of said frame, a stiff leg rule-jointedly connected to said frame adjacent the rear thereof and a jack-type landing gear mounted on said frame adjacent the front of the same.

9. In apparatus of the class described wherein a semi-trailer frame has provisions at its front end for coupling to a tractor and wherein a detachable wheeled axle unit is connected to and beneath the rear end of the frame, the improvement which comprises a stiff leg hingedly secured to and beneath the frame adjacent the rear of the same and a jack-type landing gear secured to and beneath the frame at the front of the same, means for raising and lowering said stiff leg, means for operating said jack-type landing gear, and means for limiting the lowered position of said stiff leg to a vertical position.

10. In apparatus of the class described wherein a semi-trailer frame has provisions at its front end for coupling to a tractor and wherein a detachable wheeled axle unit is connected to and beneath the rear end of the frame, the improvement which comprises a stiff leg hingedly secured to and beneath the frame adjacent the rear of the same and a jack-type landing gear secured to and beneath the frame at the front of the same, means for raising and lowering said stiff leg, means for operating said jack-type landing gear, and means for limiting the lowered position of said stiff leg to a vertical position, the hinge axis of said stiff leg, when the leg is in a vertical position, lying forward of the vertical axis of the leg.

JOHN L. EVANS.
T. N. BUSCH.

REFERENCES CITED

The following references are of record in the file of this patent:

UNITED STATES PATENTS

| Number | Name | Date |
|---|---|---|
| 1,471,548 | Clement | Oct. 23, 1923 |
| 1,743,437 | Davis | Jan. 14, 1930 |
| 1,892,004 | Reid | Dec. 27, 1932 |
| 2,155,940 | Jahn et al. | Apr. 25, 1939 |
| 2,254,532 | Knox | Sept. 2, 1941 |
| 2,350,841 | Troche et al. | June 6, 1944 |

FOREIGN PATENTS

| Number | Country | Date |
|---|---|---|
| 118,360 | Switzerland | June 1, 1927 |
| 284,548 | Great Britain | Feb. 2, 1928 |
| 616,064 | Germany | July 18, 1935 |